(12) United States Patent
Yu (10) Patent No.: US 9,988,145 B2
(45) Date of Patent: Jun. 5, 2018

(54) SUPPORTING ASSEMBLY AND UNMANNED AERIAL VEHICLE USING THE SAME

(71) Applicant: ZEROTECH (Shenzhen) Intelligence Robot Co., Ltd., Shenzhen (CN)

(72) Inventor: Wei-Yong Yu, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 0 days. days.

(21) Appl. No.: 15/356,874

(22) Filed: Nov. 21, 2016

(65) Prior Publication Data

US 2017/0144751 A1   May 25, 2017

(30) Foreign Application Priority Data

Nov. 24, 2015 (CN) .................. 2015 2 0943611 U (51) Int. Cl.
| | |
|---|---|
| *F16M 13/00* | (2006.01) |
| *B64C 27/00* | (2006.01) |
| *B64C 39/02* | (2006.01) |
| *B64D 47/08* | (2006.01) |
| *F16M 13/02* | (2006.01) |
| *F16M 11/10* | (2006.01) |
| *F16M 11/18* | (2006.01) |
| *F16M 11/20* | (2006.01) |
| *G03B 15/00* | (2006.01) |

(52) U.S. Cl.
CPC .......... *B64C 27/001* (2013.01); *B64C 39/024* (2013.01); *B64D 47/08* (2013.01); *F16M 11/10* (2013.01); *F16M 11/18* (2013.01); *F16M 11/2071* (2013.01); *F16M 13/00* (2013.01); *F16M 13/02* (2013.01); *G03B 15/006* (2013.01); *B64C 2027/002* (2013.01); *B64C 2201/027* (2013.01); *B64C 2201/127* (2013.01)

(58) Field of Classification Search
CPC ................ B64C 27/001; B64C 39/024; B64C 2027/002; B64C 27/08; B64D 47/08; F16M 13/02; F16F 9/00; F16F 15/08
USPC ........... 244/17.23; 396/12–13; 188/378–379; 248/638, 562, 636
See application file for complete search history.

(56) References Cited

U.S. PATENT DOCUMENTS

| | | | |
|---|---|---|---|
| 8,453,962 B2 * | 6/2013 | Shaw ...................... | B64C 27/20 244/12.4 |
| 8,695,917 B2 * | 4/2014 | Cranga .................. | B64C 27/001 188/379 |
| 8,774,982 B2 * | 7/2014 | Oakley ................... | B64C 27/08 244/17.23 |
| 9,061,763 B1 * | 6/2015 | Christensen ........... | A63H 17/28 |
| 9,616,998 B2 * | 4/2017 | Oakley ................. | B64C 39/024 |

(Continued)

FOREIGN PATENT DOCUMENTS

CN          204776052 U        11/2015

*Primary Examiner* — Christopher Garft (57) ABSTRACT

Disclosed is a supporting assembly and an unmanned aerial vehicle using the same, the supporting assembly includes a first base, a second base, a plurality of arms, and a damping element disposed between the first base and the second base. The second base is disposed on the first base. Each of the plurality of arms includes a proximal end and a distal end opposite to the proximal end, the proximal end is secured to the first base, and the distal end is configured for mounting a vibration source.

14 Claims, 10 Drawing Sheets

(56) References Cited

U.S. PATENT DOCUMENTS

| | | | |
|---|---|---|---|
| 2007/0089948 A1* | 4/2007 | Tanaka | F16F 13/10 188/266 |
| 2013/0026689 A1* | 1/2013 | Bloomfield | F16F 3/0935 267/140.3 |

* cited by examiner

SUPPORTING ASSEMBLY AND UNMANNED AERIAL VEHICLE USING THE SAME

CROSS-REFERENCE TO RELATED APPLICATIONS

The present application claims all benefits accruing under 35 U.S.C. § 119 from Chinese Patent Application No. 201520943611.X, filed on Nov. 24, 2015, in the State Intellectual Property Office of China, the content of which is hereby incorporated herein by reference.

FIELD

The present disclosure relates to hovering aerial vehicle, and more particularly, to a supporting assembly and an unmanned aerial vehicle using the same.

BACKGROUND

An unmanned aerial vehicle (UAV), commonly known as a drone, is an aircraft without a human pilot aboard. Small sized UAVs are increasingly used in various fields such as aerial photography, surveillance, scientific research, geological survey, and remote sensing.

Since vibrations caused by motors or air flows result in an unsatisfactory aerial photography of camera or video camera secured on gimbal, a damping component is placed between a main-body of the UAV and the gimbal to reduce the camera shocking.

BRIEF DESCRIPTION OF THE DRAWINGS

Implementations are described by way of example only with reference to the attached figures.

DETAILED DESCRIPTION

The present disclosure will be described in more details with reference to the accompanying figures.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

In the present disclosure, the terms "above," "below," "upper," "lower," "top," "bottom," "vertical," "horizontal," and other similar direction-indicating terms are used with reference to the UAV in its normal operational mode, and should not be considered limiting.

Figure 1:
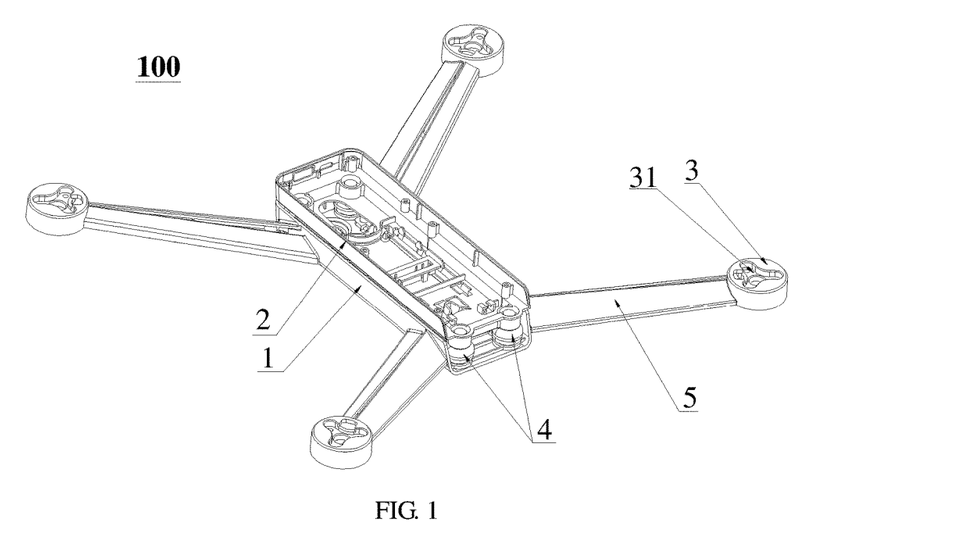
FIG. 1 is an isometric view of one embodiment of a supporting assembly.
Figure 2:
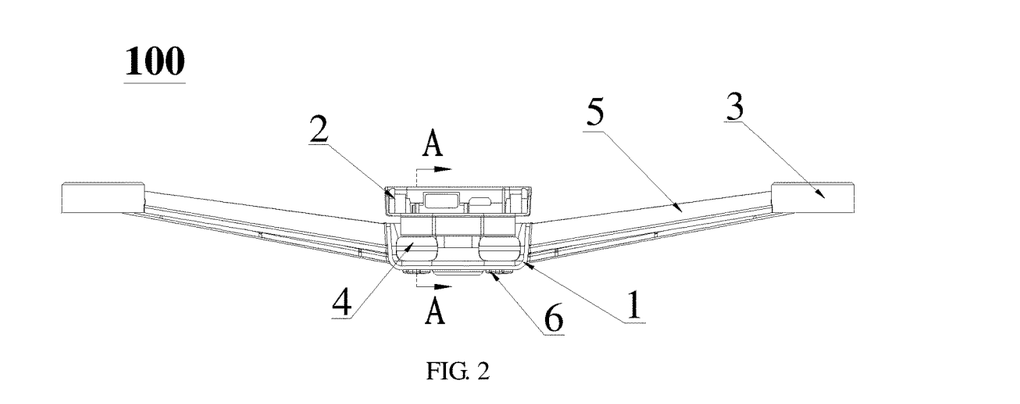
FIG. 2 is a front view of the supporting assembly of FIG. 1.

Referring to FIG. 1 and FIG. 2, one embodiment of a supporting assembly 100 of a UAV is disclosed. The supporting assembly 100 comprises a first base 1, a second base 2 located above the first base 1, a plurality of arms 5 secured to the first base 1, and a damping element 4 located between the first base 1 and the second base 2.

The second base 2 is a gimbal mounting base, and can be configured to connect with a gimbal. In one embodiment, the gimbal can be secured on the second base 2 via a gimbal mounting seat. In another embodiment, the second base 2 is also configured to carry a payload such as electrical components adapted to control various aspects of the operation of the UAV. The electrical components can comprise at least one of an energy source (e.g., battery), a flight control or navigation module, a GPS module (e.g., GPS receivers or transceivers), an inertial measurement unit (IMU) module, a communication module (e.g., wireless transceiver), and an electronic speed control (ESC) module adapted to control an actuator (e.g., electric motor).

The first base 1 is configured for securing the plurality of arms 5, which has a vibration source such as rotor assemblies mounted thereon in a one-to-one manner. The rotor assemblies, especially actuators (e.g., electric motors), are vibration sources, and the vibrations are transmitted through the arms 5 to the first base 1. In one embodiment, the second base 2 and the gimbal secured on the second base 2 can be spaced from the first base 1.

Each arm 5 comprises a proximal end and a distal end opposite to the proximal end. The arms 5 are secured to the first base 1 at the proximal end, and extend from the first base 1 in different directions. The distal end is configured for mounting the rotor assemblies. Each rotor assembly comprises a rotor (e.g., propeller) and an actuator (e.g., electric motor) to actuate blades or paddles of the rotor. The plurality of arms 5 can be arranged symmetrically with respect to a center of the first base 1 or an axis of the first base 1. The plurality of arms 5 can have the same length and extend to the same vertical height with respect to the first base 1. In other embodiments, the number of the arms 5 can be three to six.

In one embodiment, the supporting assembly 100 comprises four arms 5 symmetrically extending from the first base 1 in four directions 90 degrees apart. The four arms 5 can be respectively secured to the side wall of the first base 1 and adjacent to the four corners of a rectangle shaped bottom board of the first base 1. In another embodiment, the supporting assembly 100 comprises six arms 5 symmetrically extending from the first base 1 in six directions 60 degrees apart. The arm 5 can define a wiring channel extending from the proximal end to the distal end. The wiring channel is adapted to accommodate electrical wiring going therethrough to connect a motor adjacent to the distal end with the electrical component carried on the base. The plurality of arms 5, the first base 1, and the second base 2 can be integrated with each other as one piece.

The damping element 4 is disposed between the first base 1 and the second base 2, and is configured to attenuate the vibrations generated by the rotor assemblies, thereby preventing the vibrations caused by the rotor assemblies from transmitting to the second base 2. The first base 1 comprises a first bottom board 12. The second base 2 comprises a second bottom board 22 configured for carrying the gimbal, and the mounting portion 23 can be disposed on the second bottom board 22 of the second base 2. The damping element 4 can be disposed between the first bottom board 12 and the second bottom board 22. The damping element 4 can be an elastic element in a pressurized or compressed condition. In one embodiment, the damping element 4 comprises an upper connecting portion 40, a damping portion 41, and a lower connecting portion 42. The damping element 4 can be vertically disposed, so that the upper connecting portion 40 is connected to the second base 2, and the lower connecting portion 42 is connected to the first base 1. In one embodiment, the upper connecting portion 40 is secured to the second base 2, and/or the lower connecting portion 42 is secured to the first base 1.

The lower connecting portion 42 and the upper connecting portion 40 can be cylindrical. The lower connecting portion 42 can be disposed coaxially with the upper connecting portion 40. The upper connecting portion 40 and the lower connecting portion 42 may be hollow or solid. In one embodiment, the damping element 4 can be a hollow cylinder. The damping portion 41 can be spherical and hollow, and connected between the upper connecting portion 40 and the lower connecting portion 42. In one embodiment, the damping element 4 is made of an elastic material such as resin, rubber or the like. In another embodiment, the damping element 4 can be a vertically disposed spring.

As the vibration sources (e.g., rotor assemblies) are secured to the first base 1 via arms 5, the damping element 4 can absorb the vibrations caused by the vibration sources before they are transmitted to the second base 2. Thereby, a relative stationary environment can be obtained for the gimbal secured to the second base 2 and the photographing apparatus carried by the gimbal during the flight of the UAV to acquire clear photos and videos.

In one embodiment, the second base 2 comprises a second bottom board 22 and second side walls connecting to the second bottom board 22 at edges. The upper connecting portion 40 can be connected to the second bottom board 22 of the second base 2. The shape of the second bottom board 22 is not limited and can be a circle, oval, triangle, square, rectangle, pentagon, or hexagon. The first base 1 can also comprise a first bottom board 12 and first side walls connecting to the first bottom board 12 at edges. The first bottom board 12 can be spaced from the second bottom board 22. The lower connecting portion 42 can be connected to the first bottom board 12 of the first base 1. The shape of the first bottom board 12 is not limited and can be a circle, oval, triangle, square, rectangle, pentagon, or hexagon. In one embodiment, the first bottom board 12 has a same shape as the second bottom board 22 of the second base 2. Specifically, the second base 2 and the first base 1 can have a rectangular shape. The supporting assembly 100 can comprise a plurality of damping elements 4. In one embodiment, four damping elements 4 are respectively disposed at corners of the rectangular first bottom board 12 and the rectangular second bottom board 22.

Figure 5:
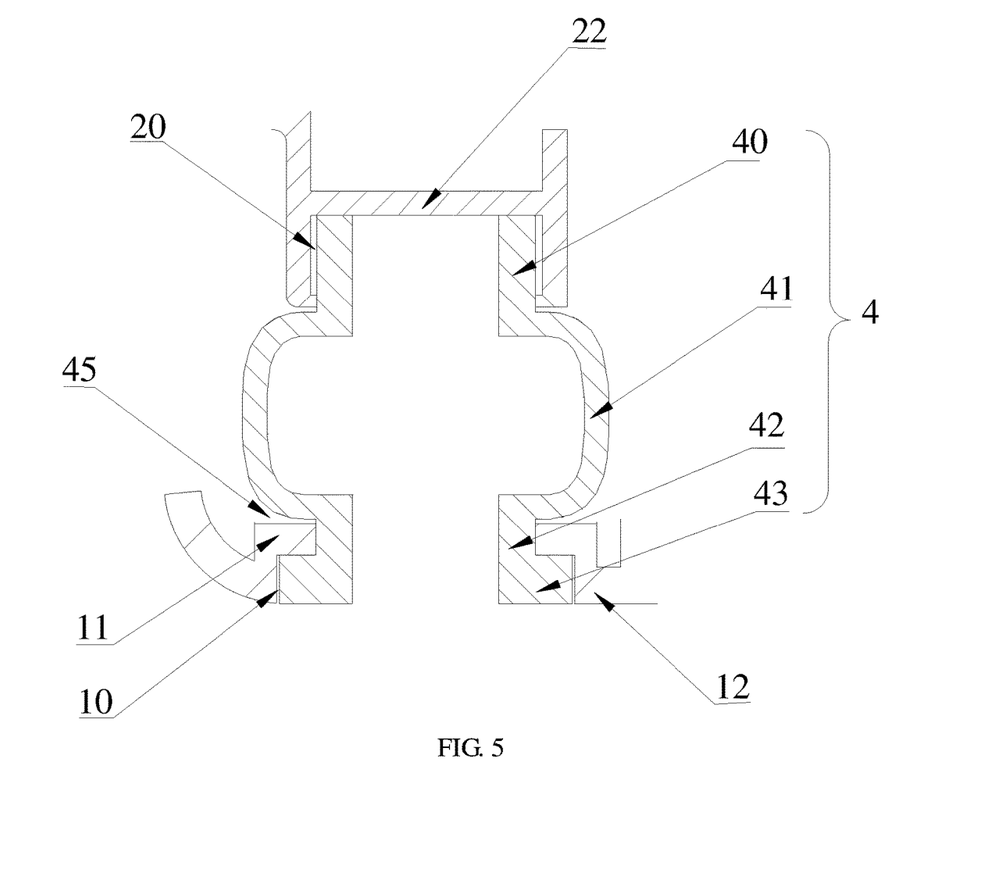
FIG. 5 is an enlarged view of a damping element of the supporting assembly of FIG. 3.
Figure 6:
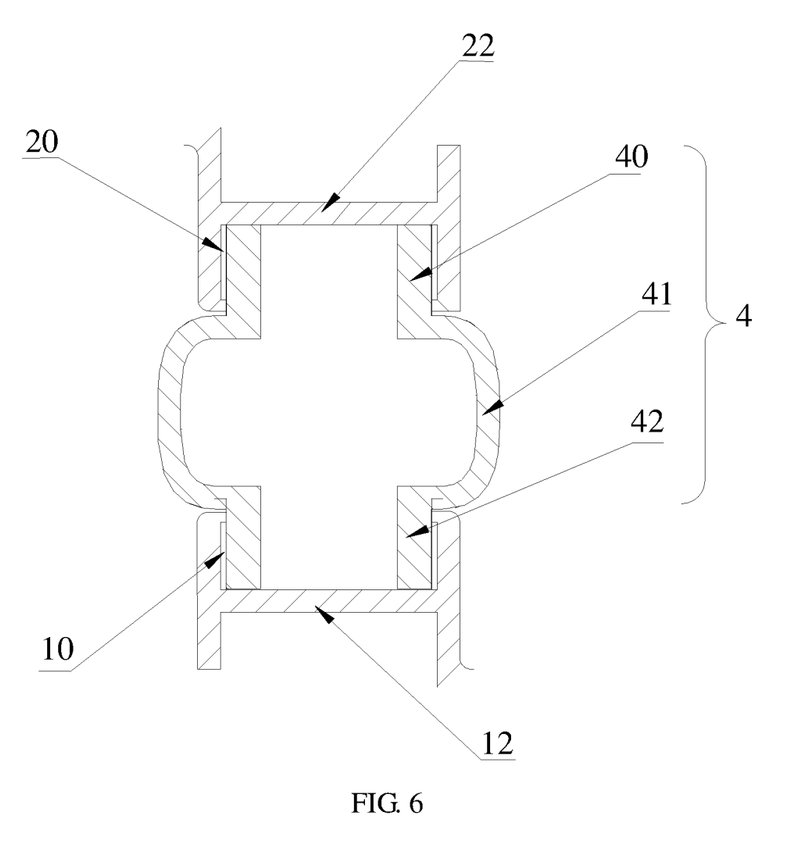
FIG. 6 is a cross-sectional view of another embodiment of the damping element.
Figure 7:
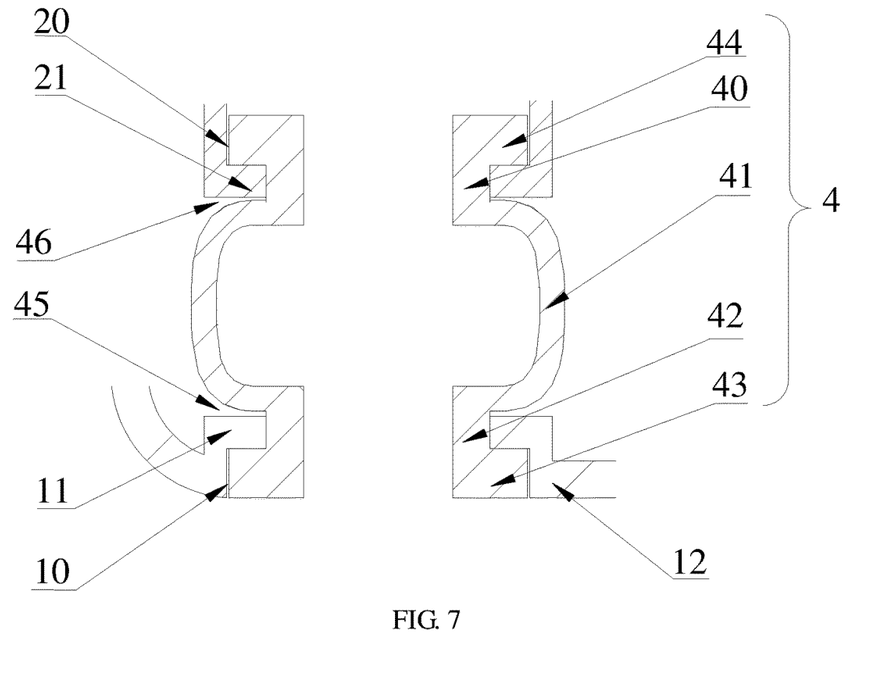
FIG. 7 is a cross-sectional view of yet another embodiment of the damping element.

Referring to FIG. 5 to FIG. 7, in some embodiments, a first limiting groove 10 is defined on the first bottom board 12 of the first base 1. A second limiting groove 20 is defined on the second bottom board 22 of the second base 2. The lower connecting portion 42 is engaged with the first limiting groove 10. The upper connecting portion 40 is engaged with the second limiting groove 20. In one embodiment, the upper connecting portion 40 and the lower connecting portion 42 can have a cylindrical shape. The first limiting groove 10 and the second limiting groove 20 can have a circular shape corresponding to the cylindrical shape, so that the upper connecting portion 40 and the lower connecting portion 42 are capable of respectively extending into and engaging with the first limiting groove 10 and the second limiting groove 20. In one embodiment, four first limiting grooves 10 are respectively defined at the corners of the first bottom board 1, four second limiting grooves 20 are respectively defined at the corners of the second bottom board 2, and four first limiting grooves, four second limiting grooves, and four damping elements are provided in a one-to-one manner.

As shown in FIG. 5 and FIG. 7, the damping element 4 can further comprise a lower flange 43, which can have a circular shape. The lower flange 43 extending outwardly from the lower connecting portion 42 can be disposed on the edge of the lower connecting portion 42. A first locking slot 45 can be defined by the lower flange 43, the lower connecting portion 42, and the damping portion 41. The first base 1 can further comprise a first protruded portion 11 disposed on the first bottom board 12, thereby the first limiting groove 10 can be a stepped limiting groove. The lower connecting portion 42 and the lower flange 43 of the damping element 4 can be inserted into the first limiting groove 10, and the first protruded portion 11 is engaged with the first locking slot 45, thereby the lower connecting portion of the damping element 4 can be secured to the first base 1.

Moreover, the damping element 4 can further comprise an upper flange 44, which can have a circular shape. The upper flange 44 extending outwardly from the upper connecting portion 40 can be disposed on the edge of the upper connecting portion 40. A second locking slot 46 can be defined by the upper flange 44, the upper connecting portion 40, and the damping portion 41. The second base 2 further comprises a second protruded portion 21 disposed on the second bottom board 22, thereby the second limiting groove 20 can be a stepped limiting groove. The upper connecting portion 40 and the upper flange 44 of the damping element 4 can be inserted into the second limiting groove 20, and the second protruded portion 21 is engaged with the second locking slot 46, thereby the upper connecting portion 40 of the damping element 4 can be secured to the second base 2.

In another embodiment, the first limiting groove 10 can be replaced with a through hole, and the second limiting groove 20 can be replaced with a through hole defined on the second bottom board 22 of the second base 2. The through holes defined on the first bottom board 12 and the second bottom board 22 can be circular through holes and/or stepped through holes.

In one embodiment, in order to ensure the reliability of the damping element 4, the elastic coefficient of the damping portion 41 is larger than the elastic coefficient of the upper connecting portion 40 and the lower connecting portion 42.

Figure 3:
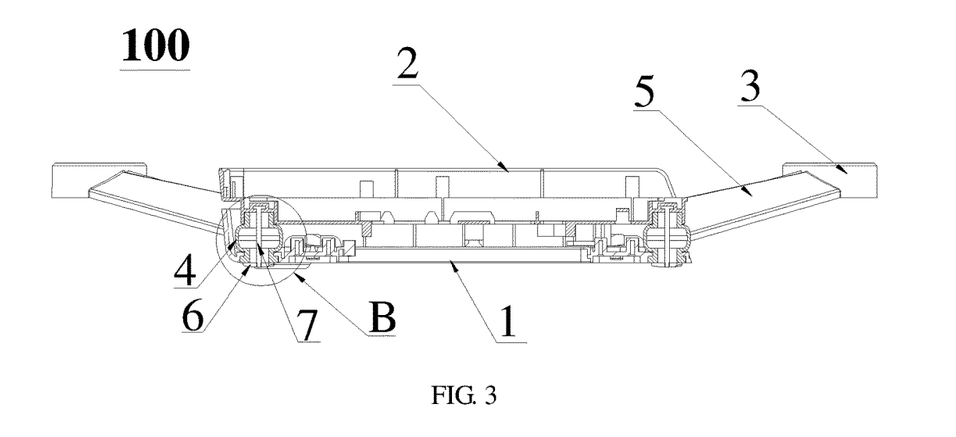
FIG. 3 is a cross-sectional view taken along a line A-A of FIG. 2.
Figure 4:
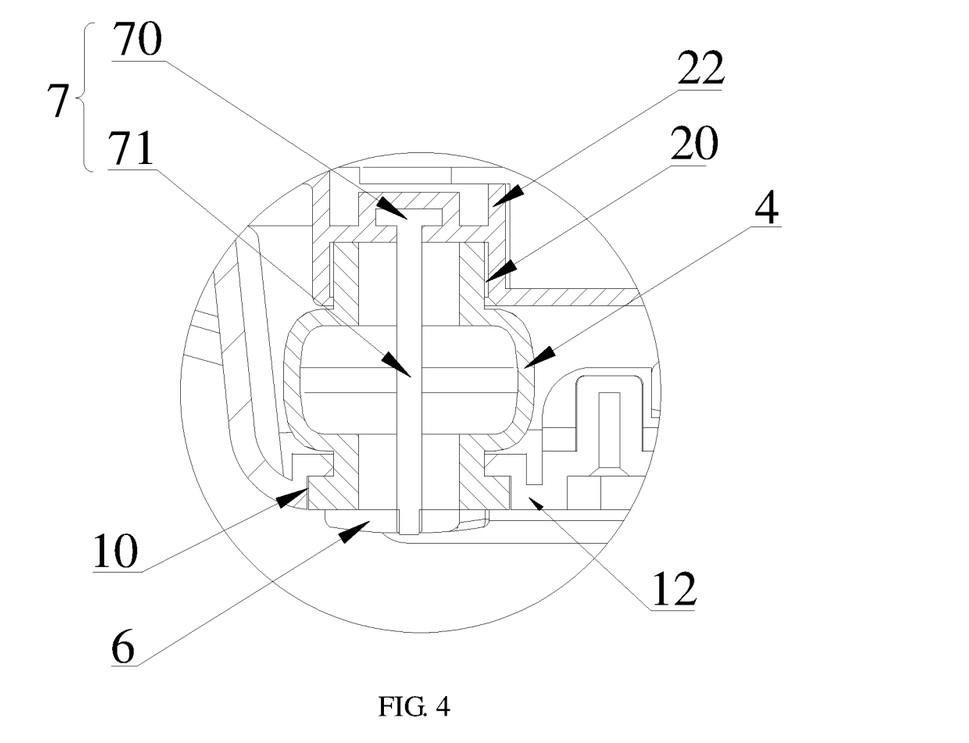
FIG. 4 is an enlarged view in a circle B of FIG. 3.

Referring to FIG. 3 and FIG. 4, the supporting assembly 100 can further comprise a plurality of supporting elements 7. The plurality of supporting elements 7 are provided in one-to-one manner with a plurality of damping elements 4. Each supporting element 7 can have a bar potion 71. The bar portion 71 is secured to the second bottom board 22 of the second base 2. For example, an upper end of the bar portion 71 is secured to the bottom surface of the second limiting groove 20, and the second limiting groove 20 is symmetric with respect to the bar portion 71. A lower end of the bar portion 71 passes through the corresponding hollow damping element 4 and protrudes out from the first base 1. The lower end of the bar portion 71 can be secured to the lower connecting portion 42. In one embodiment, the lower end of the bar portion 71 protruded out from the first base 1 can be fixedly or removably mounted to the lower connecting portion 42 via welding, riveting, or fasteners such as nut or the like. In one embodiment, the lower end of the bar portion 71 protruded out of the first base 1 is engaged with a nut 6. In order to fix the damping element tightly, the nut 6 can be a butterfly nut.

Each supporting element 7 can further comprise a disk portion 70 disposed on the upper end of the bar portion 71. In order to simplify the machining and assembly, the disk potion 70 can be integrated with the bar portion 71 as one piece. The disk portion 70 can be secured to the second bottom board 22 of the second base 2. In one embodiment, the disk portion 70 can be integrally formed with the second bottom board 22 of the second base 2, and thus the supporting assembly 100 has a simple and high-integrated stricture.

During assembly, under an external force, the damping elements 4 can be respectively inserted into the corresponding first limiting grooves 10 disposed on the first base 1. The second base 2 can then be put on the first base 1, so that each supporting elements 7 is aligned with the corresponding damping element 4. The lower end of the bar portion 71 can pass through the corresponding damping element 4 and the first base 1, and then engage with the damping element 4 via a butterfly nut 6. As the butterfly nut 6 is torqued-up to the required level according to the specific situation, the damping element 4 can be fixed between the first base 1and the second base 2 tightly.

In one embodiment, the supporting assembly 100 can further comprise a plurality of motor seats 3 secured to the distal end of the plurality of arms 5 in a one-to-one manner. The motor seats 3 are configured for mounting the rotor assemblies. The motor seat 3 can be capable of mounting the rotor assembly on a top of the motor seat 3. In some embodiments, the motor seat 3 defines several through holes or a "Y" shaped through channel 31 to receive means (e.g., screws) that fix the actuator on the top of the motor seat 3. In some other embodiments, the motor seat 3 can comprise a receptacle that is shaped and configured to receive a connector of the rotor assembly in order to fix the actuator on the top of the motor seat. The plurality of motor seats 3, the plurality of arms 5, and the first base 1 can be integrated with each other as one piece to diminish the number of components in the supporting assembly and the UAV, which can increase an overall integration degree and facilitate the assembling and disassembling of the UAV.

Figure 8:
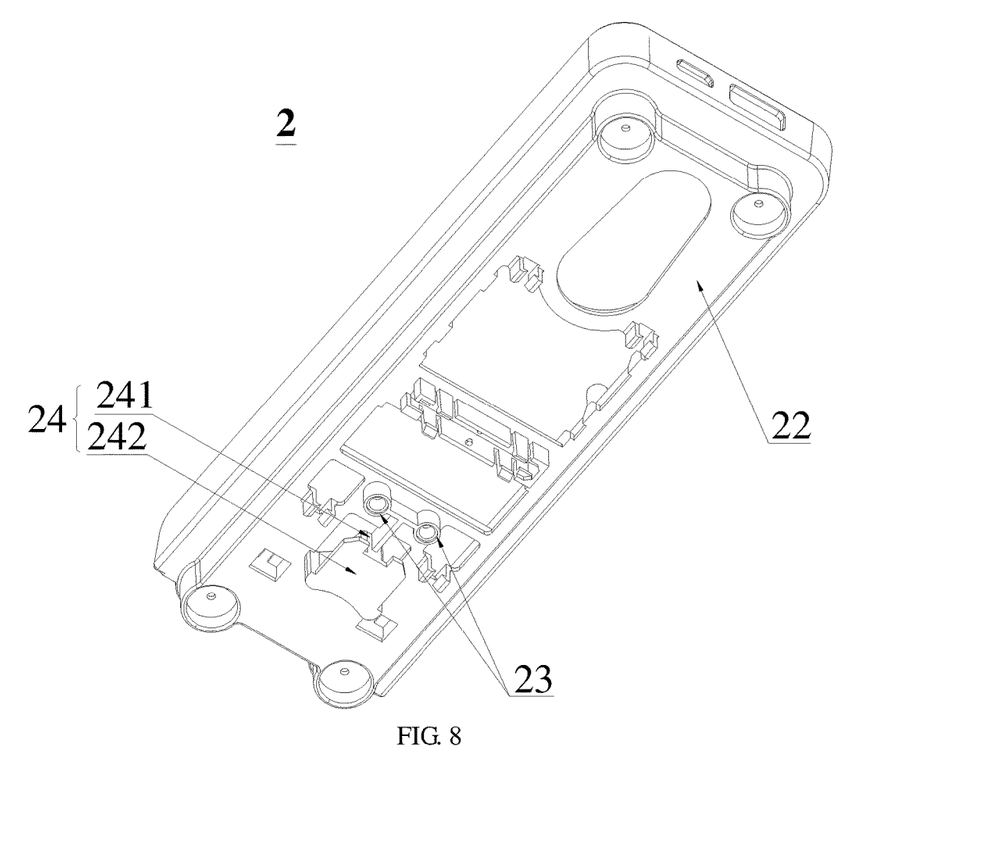
FIG. 8 is an isometric view from a bottom side of one embodiment of a second base.
Figure 9:
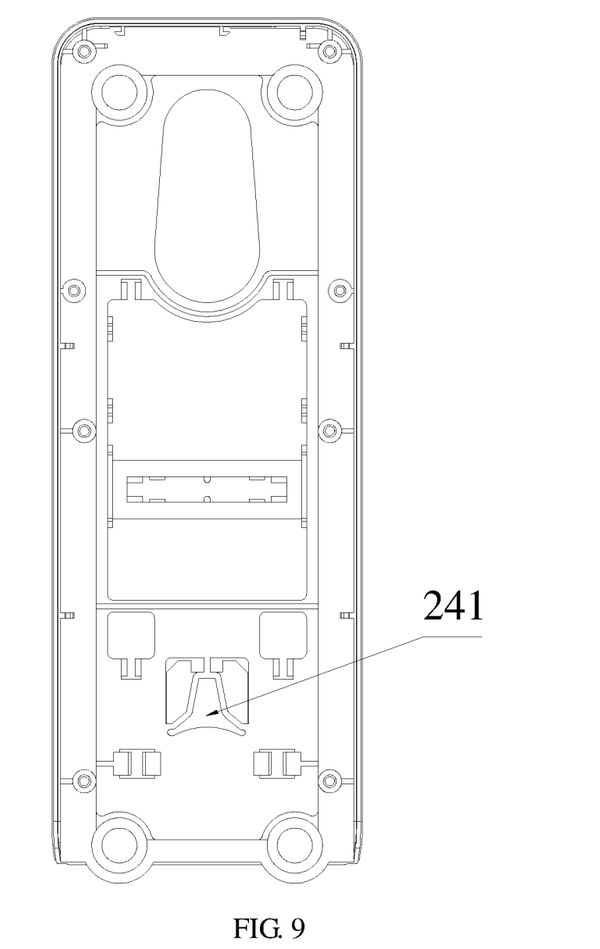
FIG. 9 is a top view of the second base of FIG. 8.
Figure 10:
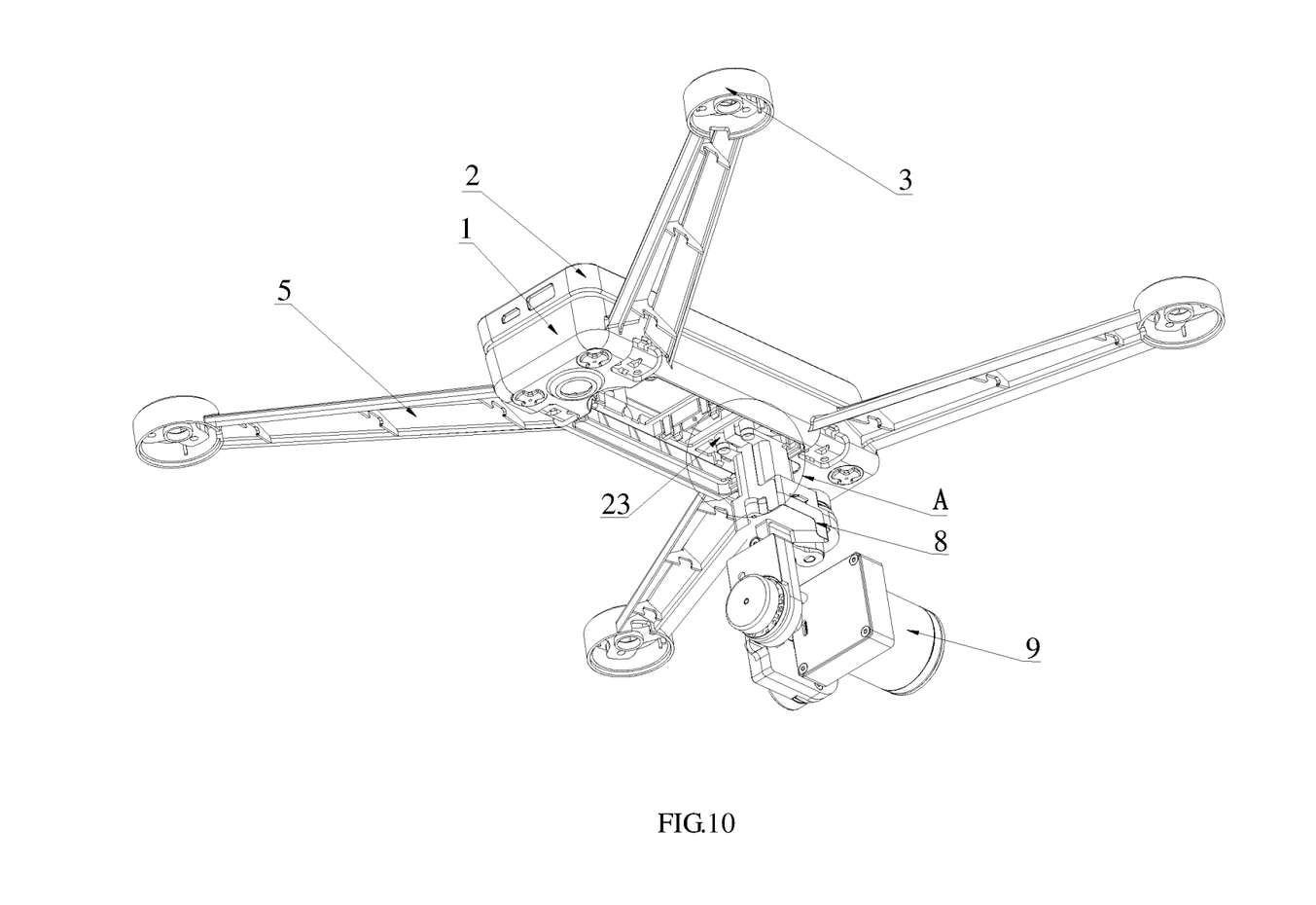
FIG. 10 is a an isometric view of one embodiment of a unmanned aerial vehicle.
Figure 12:
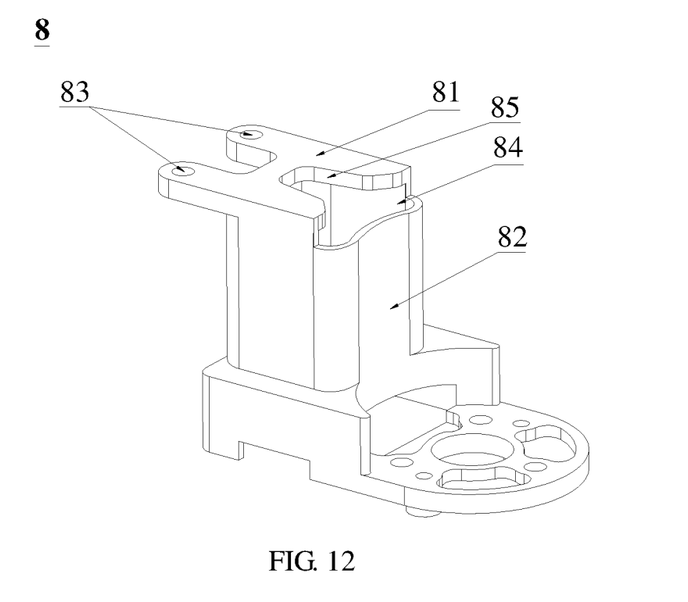
FIG. 12 is an isometric view of a gimbal mounting seat.

Referring to FIG. 8 and FIG. 9, in one embodiment, the second base 2 comprises a second bottom board 22, and a first mounting portion 23 and a second mounting portion 24 can be disposed on the second bottom board 22. In one embodiment, the first mounting portion 23 and the second mounting portion 24 are integrated with the second bottom board 22 as one piece. Referring to FIG. 12, in one embodiment, the second base 2 further comprises a gimbal mounting seat 8 for installing a gimbal. The gimbal mounting seat 8 is connected with the second bottom board 22. The first mounting portion 23 can extend downwardly along a direction from the second base 2 to the first base 1 to engage with a gimbal mounting seat 8 below the first base 1. The second mounting portion 24 can extend from the second bottom board 22 to clamp with the gimbal mounting seat 8. The second mounting portion 24 extends from the second bottom board 22 along the same direction of the first mounting portion 23. In one embodiment, the height of the second mounting portion 24 can be greater than the height of the first mounting portion 23, so that when the second mounting portion 24 is inserted into the clamping space, the fixing board can be positioned on the first mounting portion 23. In one embodiment, a reinforcing rib can be disposed between the first mounting portion 23 and the second mounting portion 24.

Referring to FIG. 12, the gimbal mounting seat 8 can comprise a fixing board 81 and a fixing pillar 82 connected with the fixing board 81, a clamping space 84 can be defined on the fixing pillar 82 along a direction of the axis of the fixing pillar 82, the second mounting portion 24 can be inserted into clamping space 84, and the fixing board 81 can be secured on the first mounting portion 23. In one embodiment, the fixing board 81 comprises a first end and a second end opposite to the first end, and a fixing through hole 83 can be defined on the first end of the fixing board 81. The gimbal mounting seat 8 can be secured to the first mounting portion 23 via a fixing device, such as a screw. In one embodiment, the fixing device can pass through the fixing through hole 83 and then engage with the mounting portion 23, thereby the gimbal mounting seat 8 can be secured on the second base 2. In one embodiment, a screw hole can be defined in the first mounting portion 23. In another embodiment, a nut corresponding to the fixing device can be disposed in the first mounting portion 23.

In one embodiment, a notch 85 can be defined on the second end of the fixing board 81 of the gimbal mounting seat 8, and the notch 85 can communicate with the clamping space 84 defined on the fixing pillar 82. In one embodiment, the second mounting portion 24 further comprises a guide projection 241 and a clamping board 242. The clamping board 242 can be disposed in parallel with the second bottom board 22, the guide projection 241 can be connected between the second bottom board 22 and the clamping board 242. The projection 241 can be ribs connected between the second bottom board 22 and the clamping board 242. In one embodiment, the guide projection 241 can be inserted into the notch 85, and the clamping board 242 can be inserted into the clamping space 84, so that the gimbal mounting seat 8 can be secure on the second base 2, and the gimbal mounting seat Scan be secured on the second base 2. In one embodiment, the guide projection 241 can have a same shape as the notch 85, and the clamping board 242 can have a same shape as the clamping space 84.

Figure 11:
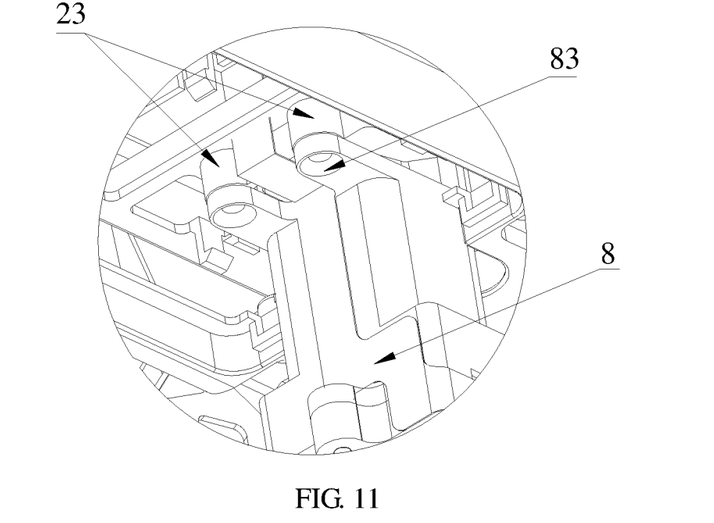
FIG. 11 is an enlarged view in a circle A of FIG. 10.

Referring to FIG. 11 and FIG. 12, one embodiment of a UAV comprises the supporting assembly 100, the gimbal mounting seat 8, the gimbal 9, and a plurality of rotor assemblies. The gimbal 9 can be secured on the second base 2 of the supporting assembly 100 through the gimbal mounting seat 8. The plurality of rotor assembles are mounted on the distal ends of the plurality of arms 5 in a one-to-one manner.

Each rotor assembly comprises the rotor (e.g., propeller) rotatable about a rotor axis and the actuator (e.g., electric motor) to actuate the rotor such that the rotor exerts an upward lift force on the arm. The rotor assembly can be mounted on top of the motor seat 3. The actuator can be fixedly and removably mounted on the motor seat 3 via fasteners such as screw, bolt, buckle, clamp, clasp, latch, hook, nail, pin strap, cable, or the like. The rotor can be mounted on the motor seat and rotatable about the rotor axis along a vertical direction.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A supporting assembly of an unmanned aerial vehicle, the supporting assembly comprising:
    a first base, comprising a first bottom board, a first protruded portion disposed on the first bottom board, and a first limiting groove defined on the first bottom board;
    a second base disposed on the first base;
    a plurality of arms each comprising a proximal end and a distal end opposite to the proximal end, the proximal end being secured to the first base, and the distal end being configured for mounting a vibration source; and
    a damping element disposed between the first base and the second base; wherein the damping element comprises an upper connecting portion, a lower connecting portion, a damping portion connected between the upper connecting portion and the lower connecting portion, a lower flange disposed on an edge of the lower connecting portion and extending outwardly from the lower connecting portion, and a first locking slot defined by the lower flange, the lower connecting portion, and the damping portion;
    wherein the first protruded portion is engaged with the first locking slot, the lower flange is engaged with the first limiting groove, thereby securing the lower connecting portion to the first base, and the upper connecting portion is connected to the second base.

2. The supporting assembly of claim 1, wherein the second base comprises a second bottom board, a first mounting portion, and a second mounting portion disposed on the second bottom board;
    the first mounting portion and the second mounting portion extend from the second bottom board.

3. The supporting assembly of claim 2, further comprising a gimbal mounting seat for installing a gimbal, wherein the gimbal mounting seat comprises a fixing board and a fixing pillar, a clamping space is defined on the fixing pillar along a direction of an axis of the fixing pillar, the second mounting portion is inserted into the clamping space, and the fixing board is secured on the first mounting portion, thereby securing the gimbal mounting seat on the second bottom board.

4. The supporting assembly of claim 3, wherein the fixing board comprises a first end and a second end opposite to the first end, a fixing through hole is defined on the first end of the fixing board, the fixing through hole is engaged with the first mounting portion via a fixing device, thereby securing the fixing board to the first mounting portion.

5. The supporting assembly of claim 4, wherein the second mounting portion comprises a guide projection and a clamping board, the clamping board is disposed substantially parallel with the second bottom board, and the guide projection is connected between the second bottom board and the clamping board;
    a notch is defined on the second end of the fixing board, the notch is communicating with the clamping space, the guide projection is inserted into the notch, and the clamping board is inserted into the clamping space.

6. The supporting assembly of claim 2, wherein the second base is spaced from the first base.

7. The supporting assembly of claim 2, wherein the upper connecting portion is connected to the second bottom board.

8. The supporting assembly of claim 2, further comprising a supporting element having a bar portion, wherein an upper end of the bar portion is secured to the second base, the bar portion passes through the damping element, and a lower end of the bar portion is secured to the damping element.

9. The supporting assembly of claim 8, wherein the supporting element further comprises a disk portion disposed on the upper end of the bar portion, and integrated with the bar portion as one piece; the disk portion is secured to the second base.

10. The supporting assembly of claim 9, wherein the disk portion is integrated with the second base as one piece.

11. The supporting assembly of claim 8, further comprising a fastener configured for engaging with the lower end of the bar portion, wherein the bar portion is secured to the damping element via the fastener.

12. The supporting assembly of claim 1, further comprising a plurality of motor seats configured for mounting rotor assemblies, wherein each of the plurality of the motor seats is secured to the distal end of each of the plurality of arms in a one-to-one manner.

13. An unmanned aerial vehicle comprising:
    a gimbal and a supporting assembly, the supporting assembly comprising:
    a first base, comprising a first bottom board, a first protruded portion disposed on the first bottom board, and a first limiting groove defined on the first bottom board;
    a second base disposed on the first base, the gimbal being secured to the second base and spaced from the first base;
    a plurality of arms each comprising a proximal end and a distal end opposite to the proximal end, the proximal end being secured to the first base, and the distal end being configured for mounting a vibration source; and
    a damping element disposed between the first base and the second base; wherein the damping element comprises an upper connecting portion, a lower connecting portion, a damping portion connected between the upper connecting portion and the lower connecting portion, a lower flange disposed on an edge of the lower connecting portion and extending outwardly from the lower connecting portion, and a first locking slot defined by the lower flange, the lower connecting portion, and the damping portion;
    wherein the first protruded portion is engaged with the first locking slot, the lower flange is engaged with the first limiting groove, thereby securing the lower connecting portion to the first base, and the upper connecting portion is connected to the second base.

14. The unmanned aerial vehicle of claim 13, wherein the second base comprises a second bottom board, and a first mounting portion and a second mounting portion are disposed on the second bottom board;

the supporting assembly comprises a gimbal mounting seat, the gimbal mounting seat comprises a fixing board and a fixing pillar, a clamping space is defined on the fixing pillar along a direction of an axis of the fixing pillar, the second mounting portion extending from the second bottom board is inserted into the clamping space, and the fixing board is secured on the first mounting portion extending from the second bottom board.

* * * * *